US012686977B2

(12) United States Patent
Marsolek et al.

(10) Patent No.: US 12,686,977 B2
(45) Date of Patent: Jul. 21, 2026

(54) ASPHALT COMPACTOR CREEP MODE

(71) Applicant: Caterpillar Paving Products Inc., Brooklyn Park, MN (US)

(72) Inventors: John L. Marsolek, Watertown, MN (US); Nathaniel S. Doy, Maple Grove, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 710 days.

(21) Appl. No.: 18/164,217

(22) Filed: Feb. 3, 2023

(65) Prior Publication Data

US 2024/0263406 A1     Aug. 8, 2024

(51) Int. Cl.
E01C 19/28 (2006.01)
B60K 31/00 (2006.01)

(52) U.S. Cl.
CPC ........ E01C 19/288 (2013.01); B60K 31/0008 (2013.01); B60K 2031/0016 (2013.01); B60K 2031/0091 (2013.01)

(58) Field of Classification Search
CPC ...... E01C 19/288; E01C 19/23; E01C 19/235; B60K 31/0008; B60K 2031/0016; B60K 2031/0091
See application file for complete search history.

(56) References Cited

U.S. PATENT DOCUMENTS 6,749,364 B1     6/2004   Baker et al.
6,881,002 B2     4/2005   Fatemi
6,918,854 B2     7/2005   Okada et al.
7,731,450 B2 *   6/2010   Congdon .............. E01C 19/288
                                                           701/50
9,476,168 B2    10/2016   Oetken et al.
10,315,644 B2    6/2019   Johri et al.
(Continued)

FOREIGN PATENT DOCUMENTS

CN         103290762 B      5/2016
DE      102022130774 A1 *   8/2023   ............. B60K 35/22
(Continued)

*Primary Examiner* — Abigail A Risic

(57) ABSTRACT

A method for operating a compactor on a compressible surface includes: moving the compactor on the compressible surface; receiving an operating speed of the compactor; determining whether an obstacle is present in a path of the compactor; and changing the operating speed to a creep speed if the obstacle is in the path of the compactor. The creep speed is sufficient to prevent the compactor from forming dips in the compressible surface.

| ELEMENT NUMBER | DESCRIPTION |
| --- | --- |
| 100 | compactor |
| 102 | cab |
| 103 | drive system |
| 104 | drums |
| 105 | surface |
| 106 | temperature sensor |
| 107 | path |
| 108 | speed sensor |
| 110 | controller |
| 112 | GPS device |
| 114 | perception system |
| 115 | control lever |
| 120 | processor |
| 122 | memory |
| 124 | data bus |
| 126 | user interface |
| 128 | communications interface |
| 129 | autonomous path planning system |
| 130 | remote system |
| 132 | work area |
| 134 | operating system (OS) |

(Continued)

-continued

| ELEMENT NUMBER | DESCRIPTION |
|---|---|
| 136 | utilities |
| 138 | creep routine |
| 140 | sensor interfaces |
| 144 | control logic module |
| 146 | settings module |

6 Claims, 6 Drawing Sheets

(56)        References Cited

U.S. PATENT DOCUMENTS

| | | | |
|---|---|---|---|
| 11,027,733 B2 | 6/2021 | Larsson et al. | |
| 11,479,926 B2 * | 10/2022 | Nagel | E01C 19/282 |
| 11,520,009 B2 * | 12/2022 | Friend | G01S 17/931 |
| 2020/0050192 A1 * | 2/2020 | O'Donnell | G05D 1/0088 |
| 2021/0239799 A1 * | 8/2021 | Friend | G01S 7/4802 |
| 2021/0403006 A1 | 12/2021 | Books et al. | |
| 2021/0404145 A1 * | 12/2021 | Endo | E02F 9/205 |
| 2021/0404553 A1 * | 12/2021 | Endo | E01C 19/26 |

FOREIGN PATENT DOCUMENTS

| | | | |
|---|---|---|---|
| JP | 7117255 B2 * | 8/2022 | |
| JP | 7161444 B2 * | 10/2022 | |

* cited by examiner

300

RECEIVE ONE OR MORE OF OPERATING SPEED, LOCATION, SURFACE TEMPERATURE, SETTING INFORMATION, COMPACTION PLAN(S), INFORMATION FROM COMMUNICATIONS INTERFACE, DIAGNOSTIC CODES — 302

OBSTACLE DETECTED IN PATH OF COMPACTOR? — 304

NO

YES

LOCATION INSIDE WORK AREA? — 306

NO

YES

SURFACE TEMPERATURE EXCEEDS THRESHOLD TEMPERATURE? — 308

NO

YES

CHANGE OPERATING SPEED TO CREEP SPEED — 310

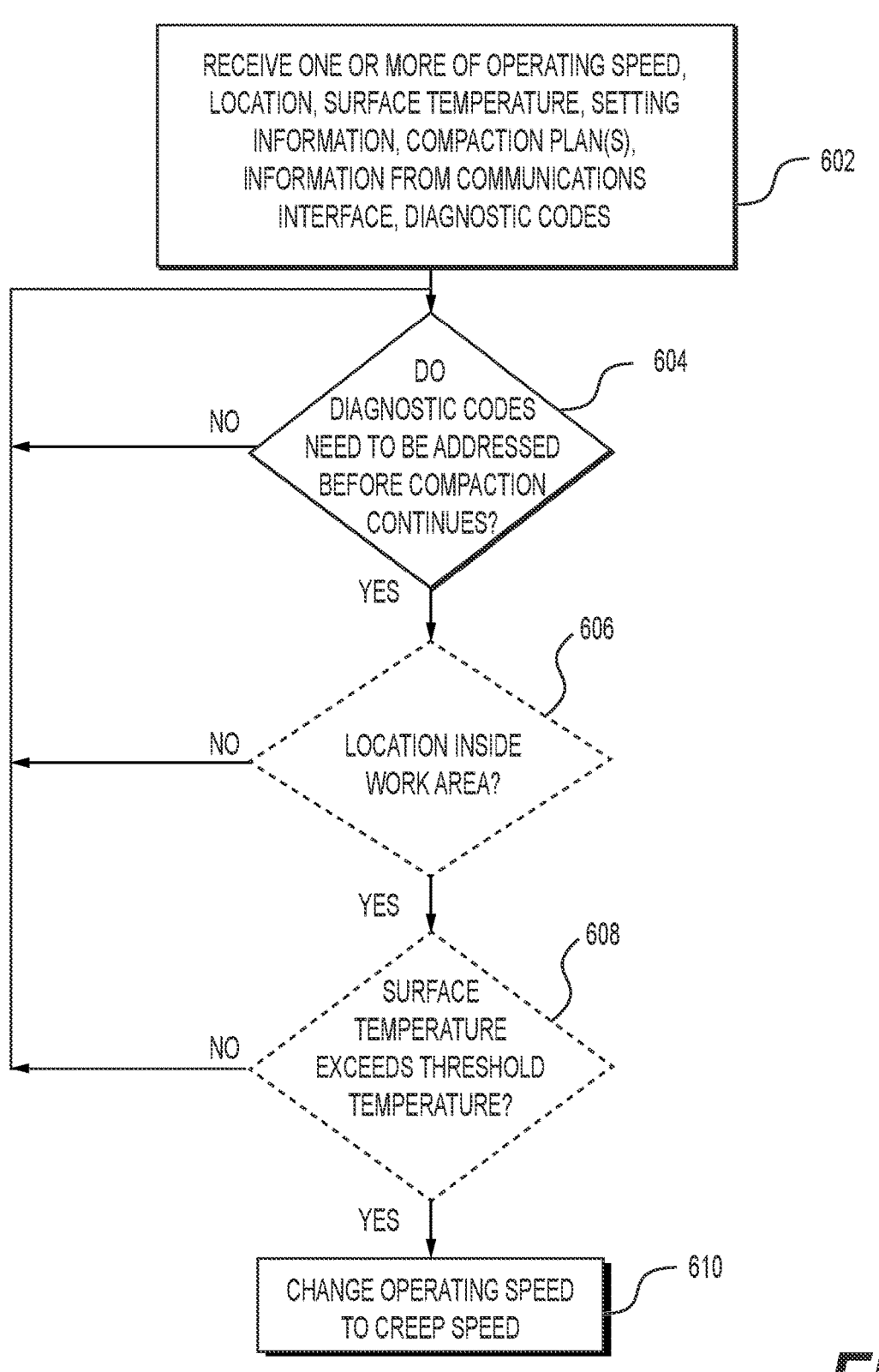

600

RECEIVE ONE OR MORE OF OPERATING SPEED, LOCATION, SURFACE TEMPERATURE, SETTING INFORMATION, COMPACTION PLAN(S), INFORMATION FROM COMMUNICATIONS INTERFACE, DIAGNOSTIC CODES — 602

DO DIAGNOSTIC CODES NEED TO BE ADDRESSED BEFORE COMPACTION CONTINUES? — 604

NO

YES

LOCATION INSIDE WORK AREA? — 606

NO

YES

SURFACE TEMPERATURE EXCEEDS THRESHOLD TEMPERATURE? — 608

NO

YES

CHANGE OPERATING SPEED TO CREEP SPEED — 610

*FIG. 6*

ASPHALT COMPACTOR CREEP MODE

FIELD

The present disclosure generally relates to controlling the ability of an asphalt compactor to slowly move or creep over asphalt so as to prevent the asphalt compactor from sinking into the asphalt.

BACKGROUND

Asphalt paving involves depositing a layer of paving material such as hot asphalt on a bed and then compacting the asphalt to a uniform thickness and consistency. Asphalt compactors use different configurations for the compacting process. Some compactors use a steel drum with vibrators. Other compactors use separate wheels, while others use a combination of separate wheels and drums. When a compactor sits idle on an area of recently placed hot asphalt, which is compressible, the drum or wheels may sink into the asphalt and over-compact those areas under the drum or wheels. Once over-compacted, the dip formed in those areas is virtually unrepairable and the deformation compared to the remaining uniform asphalt layer will remain indefinitely.

U.S. Pat. No. 9,367,042 describes a system for providing an alert when an asphalt compactor is stopped on hot asphalt. The system comprises a speed sensor, a pavement temperature sensor configured to measure a temperature of a surface, an operator alert device, and a controller. The controller is configured to determine when the compactor is stopped and when the surface of the pavement on which the compactor sits exceeds a certain temperature. The controller then issues a command to the operator alert device to provide an alert. The alert signals to the compactor operator that the compactor may need to be moved in order to avoid over-compacting the pavement surface where the compactor is stopped.

Instead of or in addition to existing solutions, there is a need to reduce the likelihood of a compactor creating dips on recently deposited hot asphalt as a result of the compactor remaining in one place on the asphalt for too much time.

SUMMARY

One aspect of the present disclosure is directed to a method for operating a compactor on a compressible surface, the method comprising: moving the compactor on the compressible surface; receiving an operating speed of the compactor; determining whether an obstacle is present in a path of the compactor; and changing the operating speed to a creep speed if the obstacle is in the path of the compactor, wherein the creep speed is sufficient to prevent the compactor from forming dips in the compressible surface.

Another aspect of the present disclosure is directed to a method for operating a compactor on a compressible surface, the method comprising: moving the compactor on the compressible surface; receiving an operating speed of the compactor; receiving information from a remote system; and changing the operating speed to a creep speed if the remote system requests a delay, wherein the creep speed is sufficient to prevent the compactor from forming dips in the compressible surface.

A further aspect of the present disclosure is directed to a method for operating a compactor on a compressible surface, the method comprising: receiving a first compaction plan, the first compaction plan including a path of the compactor on the compressible surface; moving the compactor on the compressible surface according to the first compaction plan; receiving an operating speed of the compactor; determining whether the first compaction plan is complete; determining whether a second compaction plan has been received; and changing the operating speed to a creep speed if the first compaction plan is complete and the second compaction plan has not been received, wherein the creep speed is sufficient to prevent the compactor from forming dips in the compressible surface.

BRIEF DESCRIPTION OF THE DRAWINGS

FIG. 6 is a flowchart of still another exemplary method of initializing a creep mode for equipment used in a paving environment.

DETAILED DESCRIPTION

To overcome problems associated with the prior art, the present application describes systems and methods to allow a compactor, whether operated autonomously or by an onboard human operator, to operate at a creep speed or in a creep mode. A creep speed is defined as a minimum speed at which the compactor can move across a hot asphalt surface, which is compressible, without introducing quality defects or dips into the surface as a result of the compactor sinking into the surface due to its weight. A creep mode is defined as a mode in which the compactor is operated at a creep speed. Operating the compactor at a creep speed or in a creep mode eliminates, or at least reduces, quality defects or dips in the surface as a result of the compactor sitting still on the compressible surface for too long or not moving quickly enough across the surface.

The present systems and methods also allow the compactor, when working at a job site that includes the hot asphalt surface, to never stop moving, instead switching between a higher speed and the creep mode, in which the compactor operates at a lower, creep speed. Such functionality is especially useful in a connected job site in which one or more construction vehicles, including one or more compactors as described herein, operate autonomously. To facilitate automation, the one more compactors can also incorporate inputs from onboard or offboard collision avoidance/obstacle detection systems, which are known in the art, to incorporate the one or more compactors into an autonomous path planning system in use at the connected job site. Such an autonomous path planning system can provide the compactor with one or more an individualized compaction plans that detail how the compactor will carry out compaction of particular asphalt surfaces at the job site.

To determine whether or when to operate a compactor in a creep mode or at a creep speed, the systems and methods described herein can take into consideration one or more variables associated with the compactor and/or its environment. Such variables can include at least one temperature of a surface on which the compactor is operating, a speed of the compactor, a geographical location of the compactor, a material makeup of the surface on which the compactor is operating, inputs from the autonomous path planning system, and/or other variables. Such variables are discussed in further detail below.

Figure 1:
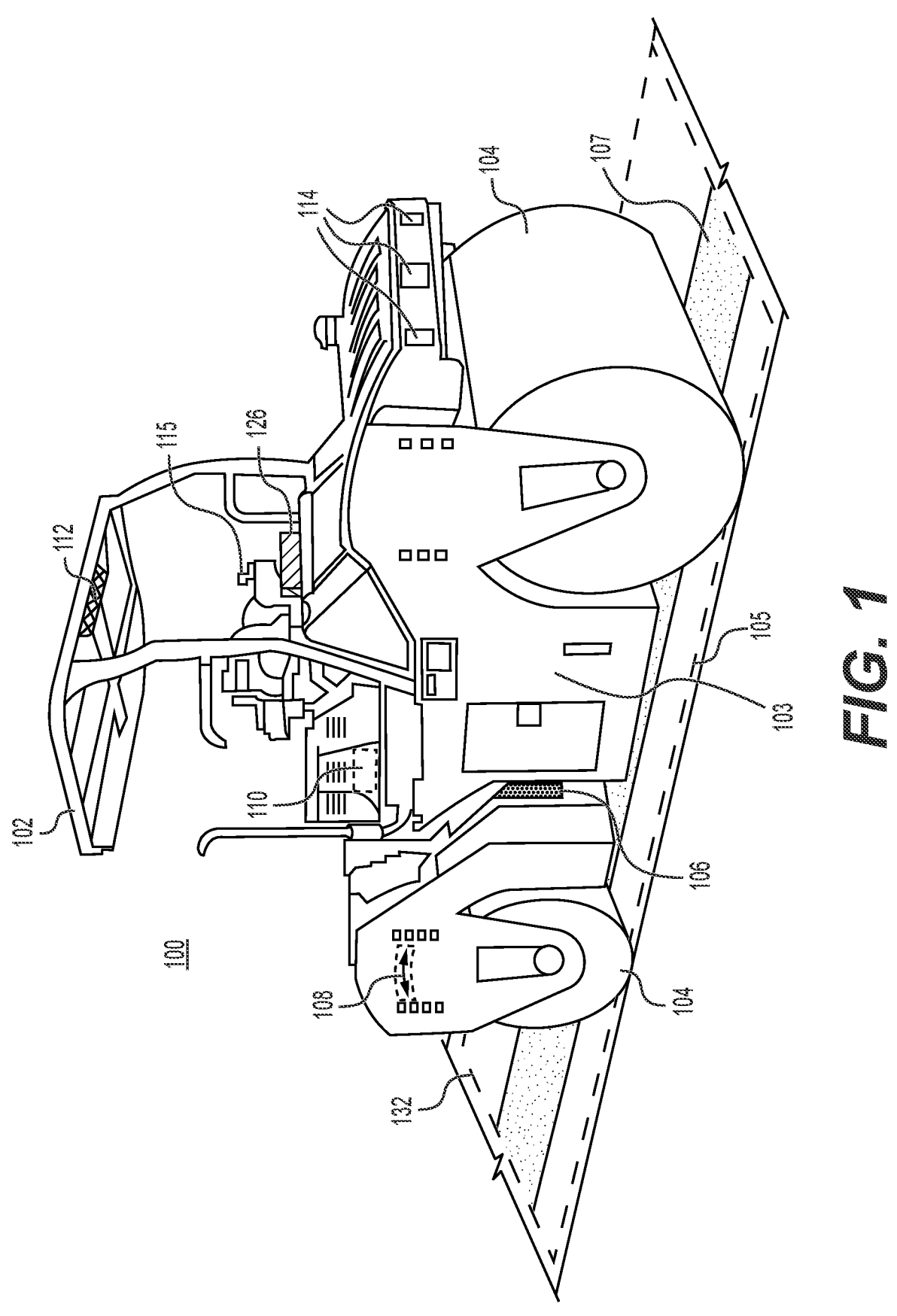
FIG. 1 shows a perspective view of a compactor.

FIG. 1 illustrates an exemplary compactor 100 according the present disclosure. The compactor 100 may include a cab 102 or sunshade, a drive system 103 configured to generate power to propel compactor 100, and one or more drums 104. Drive system 103 propels compactor 100 by driving at least one drum 104. Drive system 103 may be any type of engine (internal combustion, gas, diesel, gaseous fuel, natural gas, propane, etc.), may be of any size, with any number of cylinders, and in any configuration ("V," in-line, radial, etc.). Drive system 103 may also use hydraulics to propel compactor 100. Alternatively, or in addition, drive system 103 may comprise one or more electric motors coupled to one or more batteries, fuel cells, or other sources of electrical power. Further details of compactor 100, such as vibrators, steering mechanisms, and rollover protection systems, etc., are not described herein but are known in the industry.

Compactor 100 includes a temperature sensor 106. Temperature sensor 106 may be any appropriate type of thermal measuring or sensing device/system and preferably is capable of "remotely" sensing a temperature of a compressible surface 105 on which compactor 100 sits and at which the temperature sensor 106 is directed without the need for any portion of temperature sensor 106 to make physical contact with surface 105. However, in certain alternative implementations, appropriate "contact" types of temperature sensors, such as, for example, a thermocouple with a sensing junction, may be used. With such "contact" types of temperature sensors, caution must be taken to ensure that the contact type of temperature sensor does not scratch or otherwise damage surface 105 or become itself damaged by contact with surface 105.

Temperature sensor 106 may comprise thermal imagers, thermal scanners, or thermal imagers operating in "line-scan" mode. In some exemplary implementations, a thermal scanner such as the thermal scanner sold as Cat Grade with Thermal Mapping for Pavers may be used. Temperature sensor 106 may be mounted on the frame of compactor 100 at a height sufficiently above surface 105 so as to be capable of viewing, and thus imaging or scanning, across substantially the entire width of surface 105.

Temperature sensor 106 may include one or more temperature detectors, such as, for example, a video camera with an infrared filter, with the temperature detector for receiving heat or infrared energy from surface 105, and generating electrical signals corresponding to a thermal image of surface 105. Temperature sensor 106 may include optical elements (e.g., one or more mirrors) to present the one or more temperature detectors with infrared energy from a plurality of locations on surface 105 to construct a composite thermal image of surface 105.

In an exemplary embodiment, temperature sensor 106 may be directed to a location between drums 104. In other embodiments, one or more temperature sensors 106 may be directed in front of or behind drums 104 and may be instead of or in addition to illustrated temperature sensor 106 directed between drums 104. In this manner, temperature sensor(s) 106 is/are mounted on compactor 100 in an orientation that provides a clear line of sight to freshly applied asphalt material being laid down as surface 105 immediately in front of and/or behind compactor 100 with respect to a direction of travel of compactor 100.

Temperature sensor 106 may be configured to generate a plurality of electrical signals corresponding to the sensed temperature at a plurality of locations on surface 105. Preferably, temperature sensor 106 is capable of repeatedly scanning across at least a portion of the width of surface 105 so as to periodically sense temperature at successive sections of surface 105 along or with respect to the direction of travel of compactor 100. Thus, each side-to-side pass of temperature sensor 106 across the width of surface 105 provides temperature measurements for a strip-like section of surface 105 and the series of repeated passes and scans provides temperature information on each successive strip of surface 105 as compactor 100 continues to travel along and compact surface 105.

The electrical signals generated by temperature sensor 106, which are representative of the sensed temperature at each of the plurality of locations on surface 105, may be aggregated, processed by a controller, such as controller 110 discussed below, and transmitted by appropriate means (e.g., wireless, cellular, Wi-Fi, etc.) to a user interface, such as user interface 126 discussed below. A graphical image may therefore be generated by the user interface that is representative of the sensed temperature profile of one or more sections of surface 105 corresponding to the plurality of electrical signals received from temperature sensor 106. The user interface is capable of periodically updating graphical images that are representative of the temperature at successive sections on surface 105 as compactor 100 continues to travel.

Compactor 100 may also include a speed sensor 108 that measures and reports an operating speed of compactor 100. In some embodiments, speed sensor 108 may measure rotation of one or more of drums 104, or may be coupled to a transmission of compactor 100 to calculate compactor 100's operating speed from, if so equipped, an engine RPM and transmission gear ratio of drive system 103. In other embodiments, operating speed may be provided by a global positioning system ("GPS") device associated with compactor 100, such as GPS device 112 discussed below. In some embodiments, speed sensor 108 may not be exclusively dedicated to providing compactor 100's operating speed for use in initiating the creep mode of compactor 100 or causing compactor 100 to operate at the creep speed. For example, speed sensor 108 may be primarily used simply to indicate an operating speed of compactor 100 to an operator in a conventional manner.

In another embodiment, the operating speed of compactor 100 may not be measured directly but may be derived from a control lever 115 used by an operator to select a speed and direction of compactor 100. In this embodiment, control lever 115 is pushed forward or backward to select direction, and the distance that control lever 115 is moved from a center position determines the speed of compactor 100. When the control lever is in the neutral position, no power is applied to drive system 103 to drive compactor 100. An assumption can be made that when control lever 115 is in the neutral position compactor 100 is stopped or soon will be. Evaluation of the control lever position can be used to derive when compactor 100 is stopped or slowing down.

Compactor 100 may also include a GPS device 112 that provides a geographical location of compactor 100. For example, using GPS device 112, controller 110 of compactor 100 can determine its location with respect to a work area 132, as shown in dashed lines in FIG. 1. Work area 132 may include a subset of surface 105. Work area 132 may also be a geo-fenced area, for example. If within work area 132 it is desirable for compactor 100 to operate in a creep mode, controller 110 may then adjust the operating speed of compactor 100 to a creep speed, lowering the likelihood that compactor 100 will introduce defects or dips on surface 105 (e.g., from compactor 100 sitting still within work area 132). When not within work area 132, however, it may be desirable to not operate compactor 100 in a creep mode. Using GPS device 112, controller 110 can determine when compactor 100 is located within work area 132. Compactor 100 and its relation to work area 132 can be displayed on user interface 126. Compactor 100 may also include any of a number of different audio, video, or audio/video alerts that warn an operator of compactor 100 when compactor 100 has moved into or out of work area 132.

Compactor may further include a perception system 114 having one or more perception sensors, such as a camera, a laser scanning device, a light detection and ranging (Li-DAR) device, a radar device, and/or an ultrasonic device. Perception system 114 may also receive inputs from GPS device 112 and a remote system, such as remote system 130 described below. Perception system 114 enables collision avoidance/obstacle detection functionality on compactor 100 through the monitoring of the position of compactor 100 with respect to its surroundings. For example, if perception system 114 indicates that another piece of construction equipment lies in a path 107 of compactor 100, compactor 100 could be placed in a creep mode or operated at a creep speed to avoid a collision. In this manner, rather than compactor 100 coming to a complete stop upon detecting an obstacle, which could result in the formation of defects or dips in surface 105, compactor 100 instead creeps, reducing the likelihood of introducing defects or dips, until the obstacle is no longer present. When the obstacle is no longer in path 107 of compactor 100, compactor 100 can cease operating at the creep speed.

Drive system 103, temperature sensor 106, speed sensor 108 or control lever position sensor, GPS device 112, and perception system 114 may be coupled to a controller 110. Controller 110 may operate in a logical fashion to perform operations, execute control algorithms, store and retrieve data, and perform other desired operations, including controlling drive system 103 to change the operating speed of compactor 100. Controller 110 may include or access memory, secondary storage devices, processors, and any other components for running a program. The memory and secondary storage devices may be in the form of read-only memory ("ROM") or random access memory ("RAM") or integrated circuitry that is accessible by controller 110. Controller 110 may be a single computer or may include more than one computer disposed to control various functions and/or features of compactor 100, wherein any of the one or more computers may be disposed offboard compactor 100. The term "controller" is meant to be used in its broadest sense to include one or more computers and/or microprocessors that may be associated with compactor 100 and that may cooperate in controlling various functions and operations of compactor 100. The functionality of controller 110 may be implemented in hardware and/or software without regard to the functionality. Although controller 110 is shown as being integral with compactor 100, controller 110 could be a laptop computer, a desktop computer, a tablet, a portable scanning device, or another mobile device, such as a smartphone, or any combination thereof.

Figure 2:
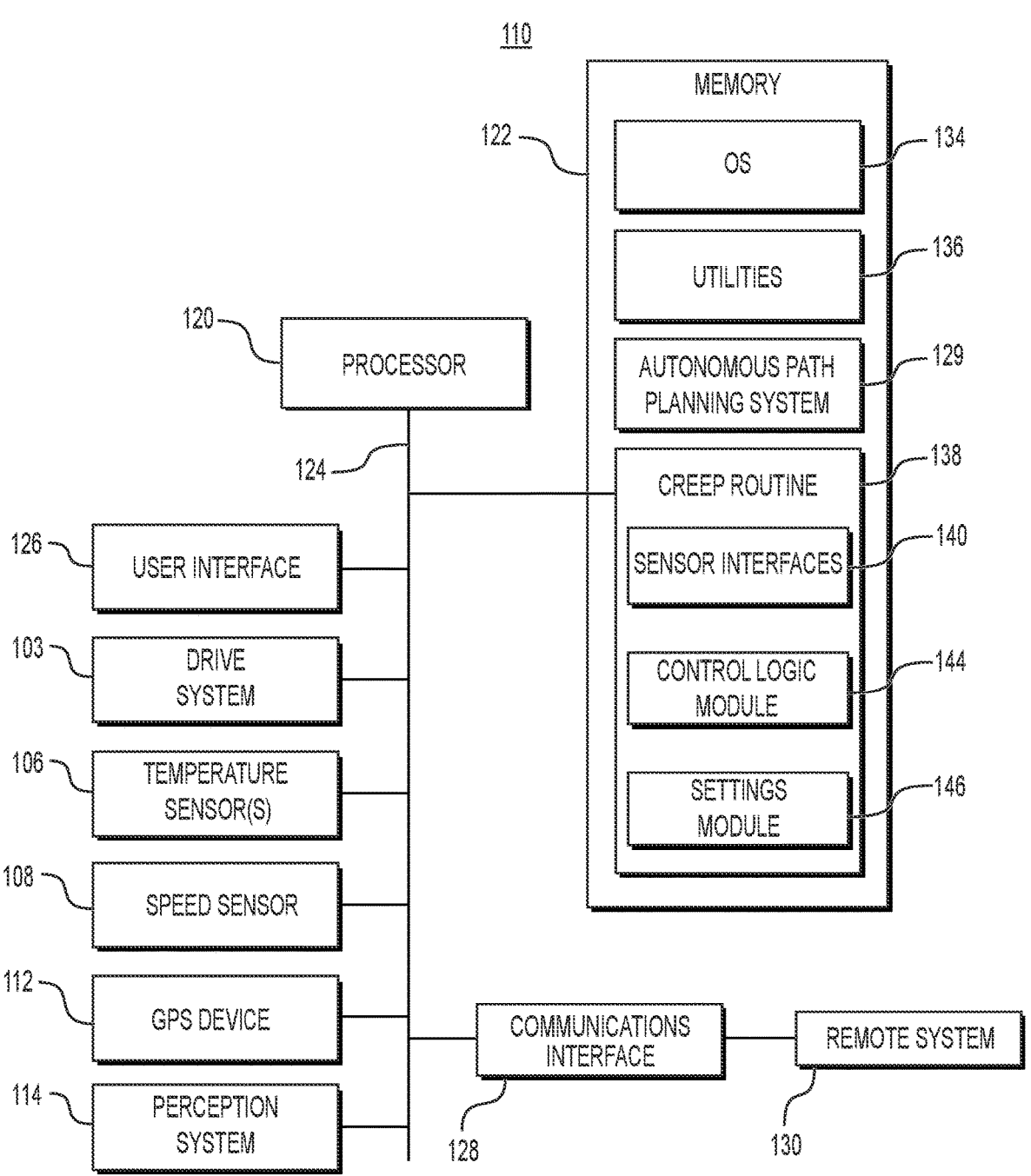
FIG. 2 is a block diagram of an exemplary controller for use in the compactor of FIG. 1.

FIG. 2 is a block diagram of an exemplary embodiment of controller 110. In this embodiment, controller 110 includes a processor 120 and a memory 122 coupled by a data bus 124. Controller 110 may also include or be connected to a user interface 126 that may feature, for example, a display, a touchscreen, a keyboard, a pointing device, or a speaker, as well as be connected to a communications interface 128. Communications interface 128 may be a wireless interface that supports one or more local or wide area communication types, such as IEEE 802.11x (WiFi), or a cellular network protocol, such as 3G, or some other data communication path. Communications interface 128 may also be a cloud-based service. Communications interface 128 may be used to send and receive information between controller 110 on compactor 100 and a remote system 130, such as a supervisor or a paving machine operating in association with compactor 100, or a back office controlling the paving operation, for example. In this manner, compactor 100 can receive instructions from remote system 130, including an associated paving machine or other piece of construction equipment in the paving operation, if desired. Such instructions could be used to determine the operation of compactor 100. In one example, remote system 130 may recognize a delay in the paving operation and indicate as much to compactor 100. Memory 122 may include an operating system (OS) 134 and utilities 136 that provide, for example, diagnostic codes and error recovery routines, as well as low-level communication and interface support functions.

Memory 122 may also include an autonomous path planning system 129. Compactor 100 can receive from autonomous path planning system 129 one or more compaction plans that detail how compactor 100 is to proceed with compacting asphalt on surface 105. In this manner, autonomous path planning system 129 can direct autonomous operation of compactor 100 at the job site. For example, compaction plan information provided by autonomous path planning system 129 can include for any given compaction plan a starting point of path 107, an ending point of path 107, a desired path 107 between the starting point and ending point, boundary points for associated work area 132, and the geographical location and desired paths of other construction equipment at the job site. Compaction plan information provided by autonomous path planning system 129 can also include a plurality of compaction plans, each including unique starting points, ending points, paths 107, etc., as well as information relating to the relation between at least two compaction plans (e.g., a sequence for completing two or more compaction plans and how to navigate from one compaction plan to the next). Autonomous path planning system 129 can receive one or more compaction plans vis-à-vis communications interface 128 and/or remote system 130.

Although aspects of autonomous path planning system 129 may be located onboard compactor 100, e.g., within controller 110, in some embodiments various aspects of autonomous path planning system 129 may be located offboard compactor 100. In the latter case, remote system 130 could also include the various offboard aspects of autonomous path planning system 129, which offboard aspects could be transmitted to compactor 100 via communications interface 128.

A creep routine 138 associated with memory 122 may include modules that support various functions associated with causing compactor 100 to operate in a creep mode or at a creep speed in certain situations. These modules may include sensor interfaces 140 that communicate with temperature sensor 106, speed sensor 108, GPS device 112, perception system 114, and communications interface 128 and provide values for associated parameters thereof to a control logic module 144. For example, perception system 114 and autonomous path planning system 129 may provide control logic module 144 with both the geographical location of stationary objects and the planned movement paths of nearby obstacles, such as other construction equipment. GPS device 112 may provide control logic module 144 with the present geographical location of compactor 100.

A settings module 146 associated with creep routine 138 also provides values for various parameters to control logic module 144. Settings module 146 may store setting information relating to local conditions and the surroundings of compactor 100, which vary. Exemplary setting information includes, for example, ambient temperature, a threshold temperature of the asphalt of surface 105 at which defects or dips are likely to be introduced, a minimum compacting speed at which compactor 100 can still effectively compact surface 105, an appropriate creep speed, and a type of asphalt of surface 105, that is, a formulation of chemicals and aggregate being compacted by compactor 100, including the associated cooling rate of the specific formulation. The type of asphalt of surface 105 may be used, based on characteristics of the mix including the cooling rate, to adjust the threshold temperature of the asphalt, the minimum compacting speed, and the creep speed. For example, a stiffer mix being used on a cool day may tolerate a longer standing time at a higher threshold temperature before damage to the asphalt occurs, thus enabling a lower creep speed. Conversely, a more flexible mix being used on a hot day may require a shorter standing time and lower threshold temperature before damage to the asphalt occurs, necessitating a higher creep speed. If the associated cooling rate of the mix is higher, the mix will become set more quickly, and the creep speed could be correspondingly lowered. Furthermore, if the associated cooling rate of the mix is lower, the mix will become set less quickly, and the creep speed could be correspondingly raised.

Settings module 146 may also store prompts that guide an operator of compactor 100 through the process of selecting, through user interface 126, the setting information, including asphalt types, temperature settings, including threshold temperature, and creep speed, by prompting selections from one or more drop-down lists. When setting information is not known, settings module 146 may be programmed to select default values. In some instances, setting information, such as asphalt temperatures, may be relayed from a paving machine associated with compactor 100 (for example, a paving machine laying down the asphalt mat that is traveled over by compactor 100). Settings module 146 may also contain an algorithm or look-up table that evaluates the various inputs and selects an adjustment to the creep speed. For example, each known asphalt type may have a plus or minus adjustment factor. Similarly, certain asphalt temperatures may also have a plus or minus adjustment factor.

Control logic module 144 evaluates data received from drive system 103, temperature sensor 106, speed sensor 108, GPS device 112, perception system 114, communications interface 128, autonomous path planning system 129, and OS 134 and/or utilities 136 and determines when to activate the creep mode or set the operating speed of compactor 100 to the creep speed. For example, control logic module 144 could instruct compactor 100 to enter creep mode if there is an obstacle (e.g., an associated paving machine, another piece of construction equipment, a wall, a large rock, etc.) in path 107 of compactor 100, if there is a delay in the production of the asphalt on surface 105 that compactor 100 needs to compact, if compactor 100 has completed its currently assigned compaction plan and has yet to receive its next work area 132 or its next (e.g., a second) compaction plan, or if compactor 100 generates diagnostic trouble codes that need to be addressed before the current compaction plan can resume, etc. Specifically with respect to detecting an obstacle in path 107 of compactor 100, control logic module 144 could instruct compactor 100 to enter creep mode if compactor 100 gets too close to the paving machine or another piece of construction equipment with which compactor 100 is working.

In this manner, any issue that traditionally would cause compactor 100 to come to an abrupt stop can now be effectively handled by instead operating compactor 100 in creep mode until the issue is resolved. Furthermore, while in creep mode, compactor 100 can rely on its various systems, including GPS device 112, perception system 114, and autonomous path planning system 129, to intelligently navigate a detected obstacle, to move to another phase of the current compaction plan where compactor 100 can resume compacting, or to move to the next compaction plan (e.g., a second compaction plan).

Instead of relying on data from drive system 103, temperature sensor 106, speed sensor 108, GPS device 112, perception system 114, communications interface 128, and autonomous path planning system 129, and OS 134 and/or utilities 136, compactor 100 can also be manually placed into a creep mode by the operator of compactor 100, or by a supervisor of remote system 130 or of autonomous path planning system 129.

Figure 3:
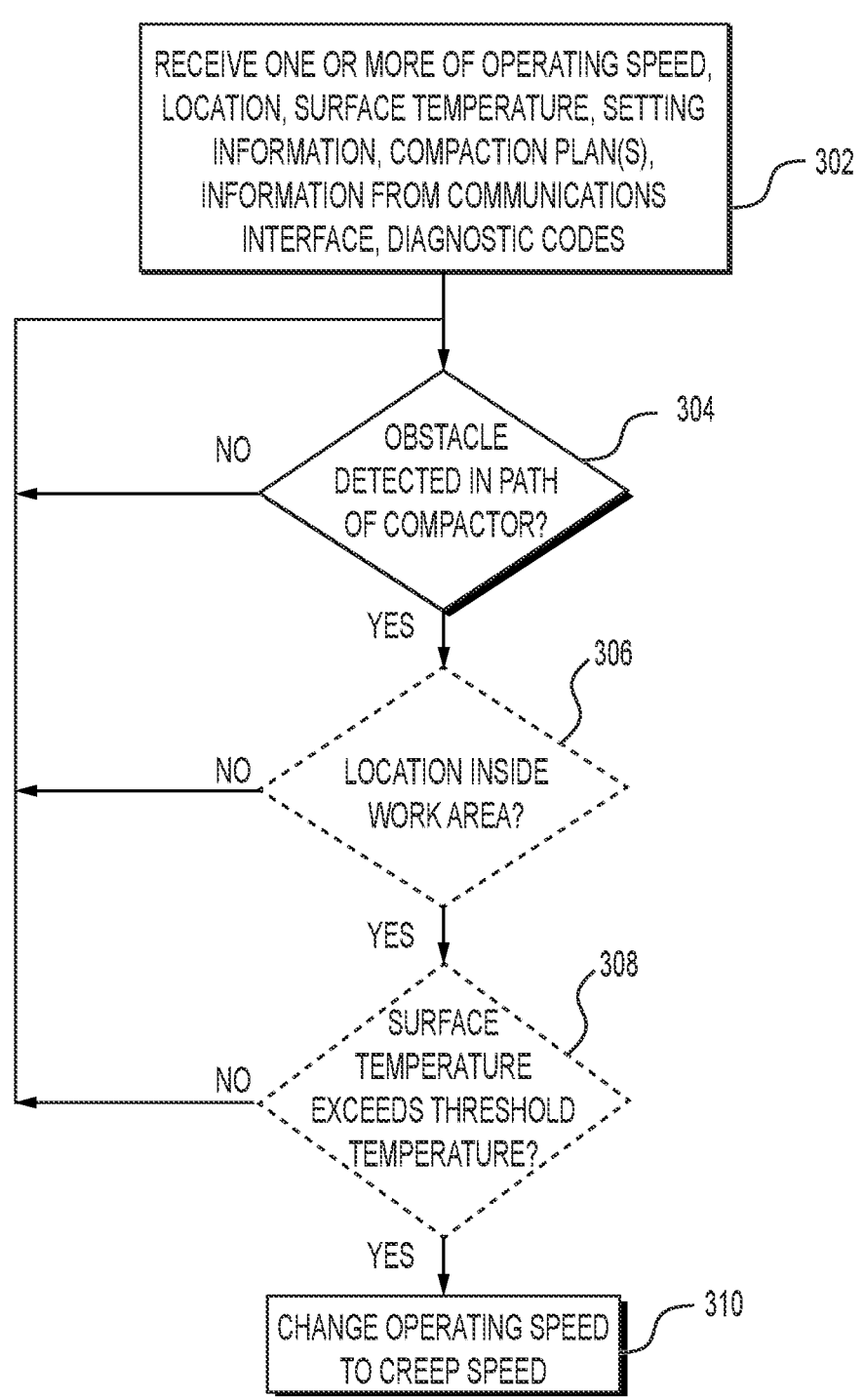
FIG. 3 is a flowchart of an exemplary method of initializing a creep mode for equipment used in a paving environment.

FIG. 3 is a flowchart of a method 300 for evaluating when to set an operating speed of compactor 100 to a creep speed. At block 302, information used to determine whether to operate compactor 100 at the creep speed may be received (e.g., in controller 110 or processor 120 thereof). Such information may be an operating speed of compactor 100 from speed sensor 108, a location of compactor 100 from GPS device 112, a surface temperature of surface 105 from temperature sensor 106, setting information from settings module 146, one or more compaction plans from autonomous path planning system 129, information from remote system 130 received via communications interface 128, and/or diagnostic codes from OS 134 and/or utilities 136, etc.

In some embodiments, default values for the setting information stored in settings module 146 may be installed at the time of manufacture or initial installation of controller 110 into compactor 100. Each piece of setting information may affect corresponding characteristics of the evaluation process, including adjustments to the creep speed, as discussed herein.

At block 304, perception system 114 is used to determine whether there is an obstacle in path 107 of compactor 100. If there is an obstacle in path 107 of compactor 100, method 300 proceeds to the next step. If there is not an obstacle in path 107 of compactor 100, method 300 continues monitoring, using perception system 114, whether an obstacle appears in path 107 of compactor 100. As discussed above, perception system 114 uses one or more perception sensors, such as a camera, a laser scanning device, a LiDAR device, a radar device, and/or an ultrasonic device, for obstacle detection/collision avoidance purposes.

At block 306, which is optional, GPS device 112 is used to provide the geographic location of compactor 100 with respect to work area 132 on surface 105. As discussed above, work area 132 may include a subset of surface 105. Work area 132 may also be a geo-fenced area. Using GPS device 112, controller 110 can determine when compactor 100 is located within work area 132. If compactor 100 is located within work area 132, method 300 proceeds to the next step. If compactor 100 is not located within work area 132, method 300 continues monitoring the location of compactor 100, using GPS device 112, until compactor 100 is within work area 132. Compactor 100 and its relation to work area 132 can be displayed on user interface 126.

At block 308, which is also optional, temperature sensor 106 is used to provide the surface temperature of asphalt on surface 105. As discussed above, temperature sensor 106 may be any appropriate type of thermal measuring or sensing device/system and preferably is capable of "remotely" sensing a temperature of surface 105 on which compactor 100 sits and at which the temperature sensor 106 is directed without the need for any portion of temperature sensor 106 to make physical contact with surface 105. In an exemplary embodiment, temperature sensor 106 may be directed to a location between drums 104. In other embodiments, one or more temperature sensors 106 may be directed in front of or behind drums 104 and may be instead of or in addition to illustrated temperature sensor 106 directed between drums 104. If the surface temperature exceeds a threshold temperature of the asphalt of surface 105, which is a temperature at which defects or dips are likely to be introduced into surface 105 if compactor 100 remains stationary on surface 105, method 300 proceeds to the next step. If the surface temperature does not exceed the threshold temperature, method 300 continues monitoring the surface temperature of surface 105, using temperature sensor 106, until the surface temperature exceeds the threshold temperature. As discussed above, the threshold temperature may be received from settings module 146 and may, for example, be a default value or a value input by a user.

At block 310, controller 110 changes the operating speed of compactor 100 to a creep speed if one or more requirements are met. For example, in an embodiment, controller 110 changes the operating speed of compactor 100 to a creep speed if perception system 114 detects an obstacle in path 107 of compactor 100. In another embodiment, controller 110 changes the operating speed of compactor 100 to a creep speed if perception system 114 detects an obstacle in path 107 of compactor 100 and GPS device 112 indicates that a location of compactor 100 is within work area 132 on surface 105. In yet another embodiment, controller 110 changes the operating speed of compactor 100 to a creep speed if perception system 114 detects an obstacle in path 107 of compactor 100 and temperature sensor 106 indicates that a surface temperature of surface 105 exceeds a threshold temperature. In still another embodiment, controller 110 changes the operating speed of compactor 100 to a creep speed if perception system 114 detects an obstacle in path 107 of compactor 100, GPS device 112 indicates that a location of compactor 100 is within work area 132 on surface 105, and temperature sensor 106 indicates that a surface temperature of surface 105 exceeds a threshold temperature.

Figure 4:
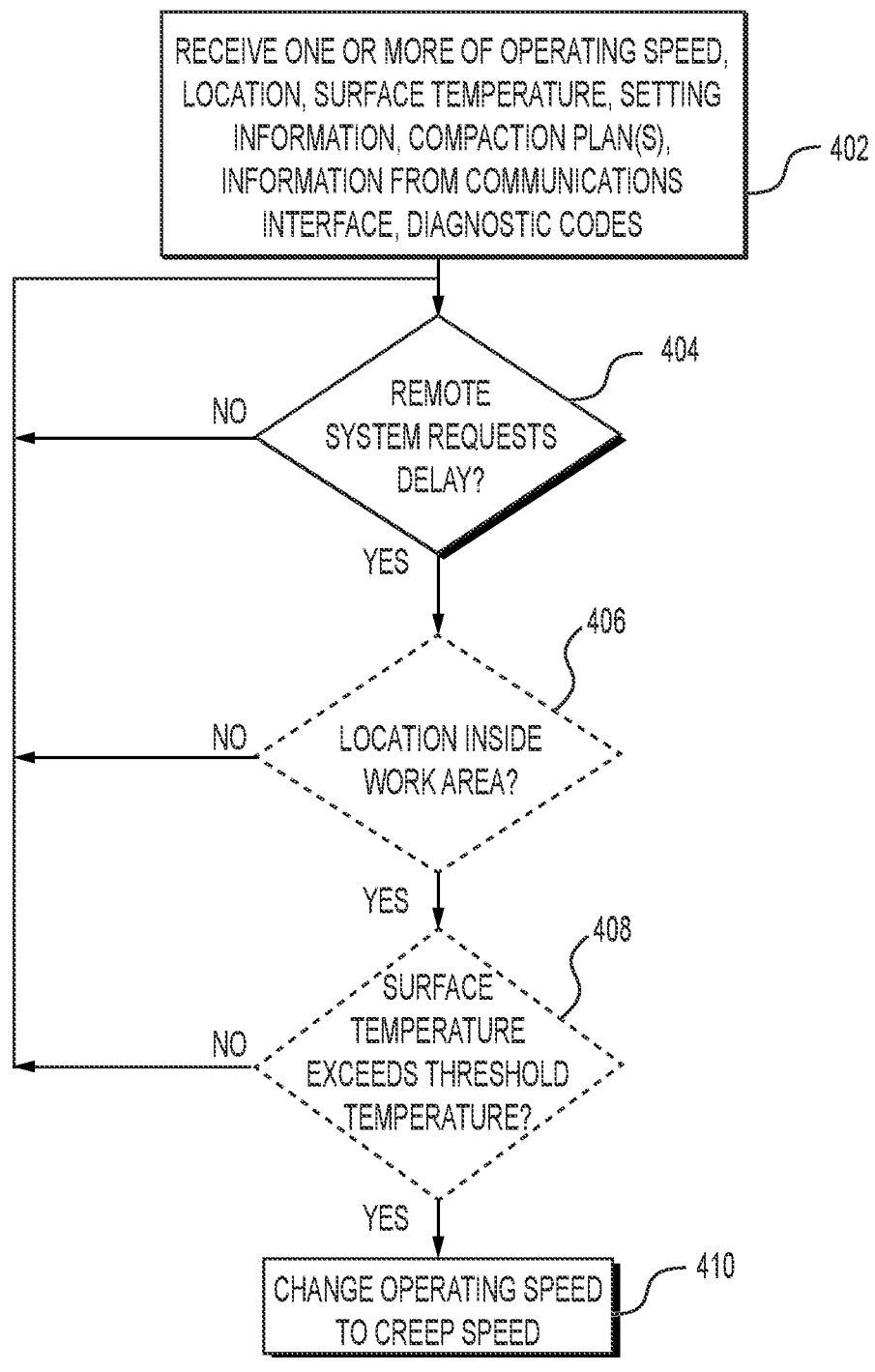
FIG. 4 is a flowchart of an another exemplary method of initializing a creep mode for equipment used in a paving environment.
Figure 5:
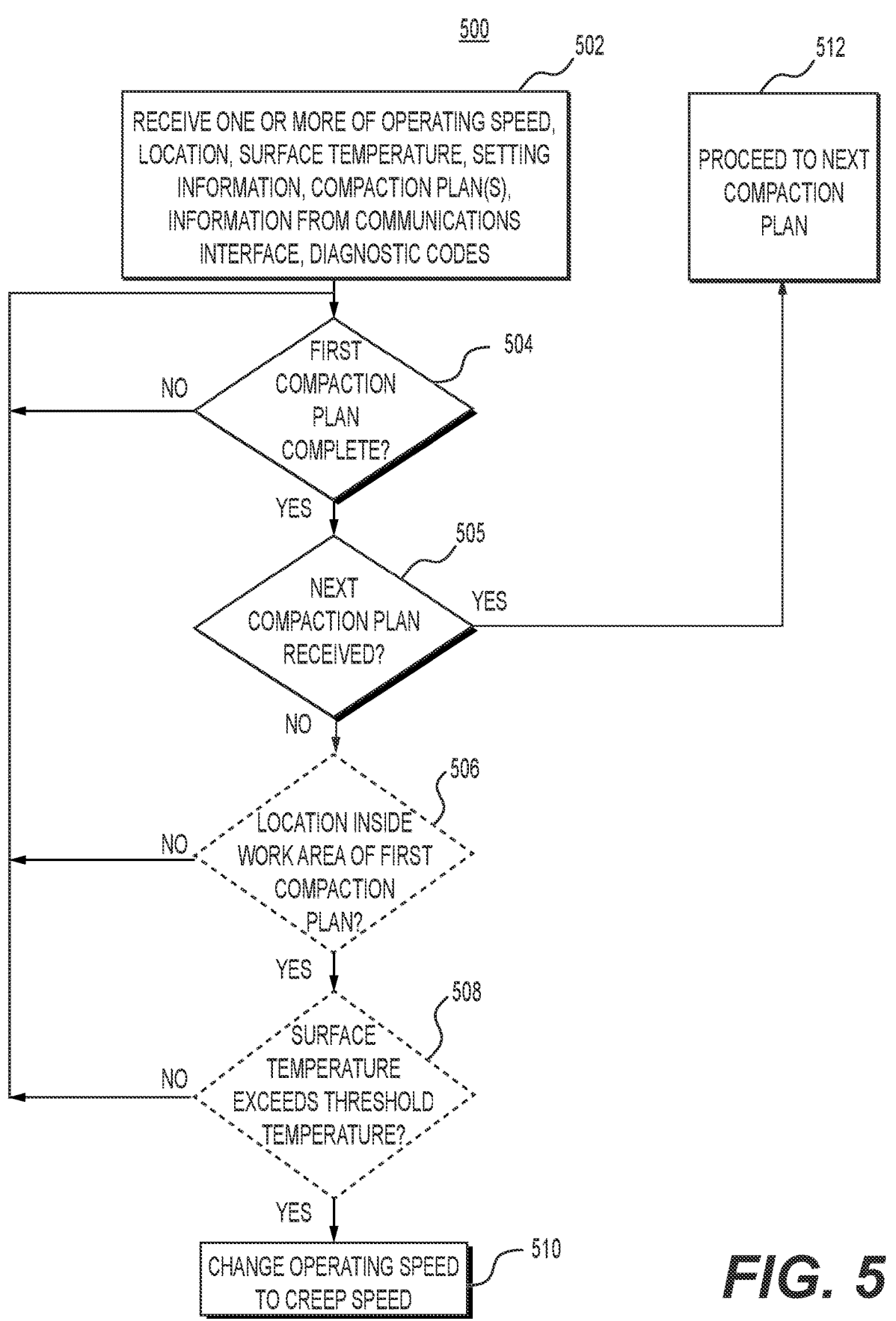
FIG. 5 is a flowchart of yet another exemplary method of initializing a creep mode for equipment used in a paving environment.

FIGS. 4-6 show other representative use cases of the systems and methods of the present disclosure. FIG. 4 is directed to a method 400 in which in block 402 information is received from remote system 130 via communications interface 128, specifically information that assists in controlling compactor 100 and determining whether compactor 100 should enter creep mode. In one example, remote system 130 can be an associated paving machine being operated along with compactor 100 to compact surface 105. The paving machine produces and deposits onto surface 105 the asphalt that compactor 100 will compact. In another example, remote system 130 can be another piece of construction equipment associated with the paving operation of which compactor 100 is a part, such as a truck that supplies material (e.g., asphalt) to the paving operation. It is therefore conceivable that the paving machine or another piece of equipment in the paving operation, such as the asphalt supply truck, causes a delay in the paving operation (e.g., in producing asphalt, depositing asphalt on surface 105, or delivering asphalt to the paving operation) such that the paving operation will need to cease at least temporarily.

In such situations, the paving machine or another piece of construction equipment associated with the paving operation, as remote system 130, can send a command to compactor 100 via communications interface 128 that compactor 100 should either enter creep mode or evaluate whether to enter creep mode based on information received from remote system 130, possibly along with additional information, as shown in block 402. That additional information may be an operating speed of compactor 100 from speed sensor 108, a location of compactor 100 from GPS device 112, a surface temperature of surface 105 from temperature sensor 106, obstacle information from perception system 114, setting information from settings module 146, one or more compaction plans from autonomous path planning system 129, and/or diagnostic codes from OS 134 and/or utilities 136, etc.

At block 404, controller 110 analyzes whether remote system 130 requests that compactor 100 delay its compaction of surface 105. If controller 110 receives an indication that remote system 130 has requested a delay (e.g., because the paving operation has been temporarily halted), method 400 proceeds to the next step. If controller 110 has not received an indication that remote system 130 has requested a delay, method 400 continues monitoring, using communications interface 128, whether remote system 130 has requested a delay.

At block 406, which is optional, GPS device 112 is used to provide the geographic location of compactor 100 with respect to work area 132 on surface 105. Block 406 works the same as block 306, as described above.

At block 408, which is also optional, temperature sensor 106 is used to provide the surface temperature of asphalt on surface 105. Block 408 works the same as block 308, as described above.

At block 410, controller 110 changes the operating speed of compactor 100 to a creep speed if one or more requirements are met. For example, in an embodiment, controller 110 changes the operating speed of compactor 100 to a creep speed if controller 110 receives an indication that remote system 130 has requested a delay. In another embodiment, controller 110 changes the operating speed of compactor 100 to a creep speed if controller 110 receives an indication that remote system 130 has requested a delay and GPS device 112 indicates that a location of compactor 100 is within work area 132 on surface 105. In yet another embodiment, controller 110 changes the operating speed of compactor 100 to a creep speed if controller 110 receives an indication that remote system 130 has requested a delay and temperature sensor 106 indicates that a surface temperature of surface 105 exceeds a threshold temperature. In still another embodiment, controller 110 changes the operating speed of compactor 100 to a creep speed if controller 110 receives an indication that remote system 130 has requested a delay, GPS device 112 indicates that a location of compactor 100 is within work area 132 on surface 105, and temperature sensor 106 indicates that a surface temperature of surface 105 exceeds a threshold temperature.

FIG. 5 is directed to a method 500 in which in block 502 information is received from autonomous path planning system 129, specifically information that assists in controlling compactor 100 and determining whether compactor 100 should enter creep mode. In one example, autonomous path planning system 129 can provide to compactor 100 one or more compaction plans that indicate how compactor 100 should compact one or more surfaces 105. It is therefore conceivable that compactor 100 will complete a given compaction plan for a given surface 105, at which time compactor 100 will need to proceed to the next compaction plan (e.g., a second compaction plan) for the next surface 105. However, it is also conceivable that the paving operation at the current surface 105 (associated with the current compaction plan) has yet to be completed by the other construction equipment involved in the paving operation for that surface 105, or that compactor 100 has yet to receive the next compaction plan (e.g., if the next surface 105 to be compacted has yet to be determined) vis-à-vis autonomous path planning system 129. In such situations, rather than have compactor 100 come to a stop, it may instead be desirable for compactor 100 to enter its creep mode.

In such situations, information is provided vis-a-vis autonomous path planning system 129, possibly along with additional information, that causes compactor 100 to enter creep mode or evaluate whether to enter creep mode, as shown in block 502. That additional information may be an operating speed of compactor 100 from speed sensor 108, a location of compactor 100 from GPS device 112, a surface temperature of surface 105 from temperature sensor 106, obstacle information from perception system 114, setting information from settings module 146, information from remote system 130 received via communications interface 128, and/or diagnostic codes from OS 134 and/or utilities 136, etc.

Consequently, at block 504, controller 110 analyzes whether a first compaction plan received through autonomous path planning system 129 has been completed. If controller 110 receives an indication that the first compaction plan has been completed, method 500 proceeds to the next step. If controller 110 has not received an indication that the first compaction plan has been completed, method 500 continues monitoring, using controller 110, whether the first compaction plan has been completed.

At block 505, controller 110 analyzes whether a next compaction plan (e.g., a second compaction plan) has been received through autonomous path planning system 129. If autonomous path planning system 129 has received the next compaction plan, method 500 continues to step 512, where compactor 100 proceeds to the next compaction plan. If autonomous path planning system 129 has not received the next compaction plan, method 500 continues to the next step to determine whether compactor 100 should enter its creep mode.

At block 506, which is optional, GPS device 112 is used to provide the geographic location of compactor 100 with respect to work area 132 on surface 105, all in connection with the first compaction plan. In this manner, block 506 generally works the same as block 306, as described above.

At block 508, which is also optional, temperature sensor 106 is used to provide the surface temperature of asphalt on surface 105, again in connection with the first compaction plan. In this manner, block 508 generally works the same as block 308, as described above.

At block 510, controller 110 changes the operating speed of compactor 100 to a creep speed if various requirements are met. For example, in an embodiment, controller 110 changes the operating speed of compactor 100 to a creep speed if controller 110 receives an indication that the first compaction plan is complete and controller 110 has yet to receive the next compaction plan. In another embodiment, controller 110 changes the operating speed of compactor 100 to a creep speed if controller 110 receives an indication that the first compaction plan is complete, controller 110 has yet to receive the next compaction plan, and GPS device 112 indicates that a location of compactor 100 is within work area 132 on surface 105 (associated with the first compaction plan). In yet another embodiment, controller 110 changes the operating speed of compactor 100 to a creep speed if controller 110 receives an indication the first compaction plan is complete, controller 110 has yet to receive the next compaction plan, and temperature sensor 106 indicates that a surface temperature of surface 105 (associated with the first compaction plan) exceeds a threshold temperature. In still another embodiment, controller 110 changes the operating speed of compactor 100 to a creep speed if controller 110 receives an indication that the first compaction plan is complete, controller 110 has yet to receive the next compaction plan, GPS device 112 indicates that a location of compactor 100 is within work area 132 on surface 105 (associated with the first compaction plan), and temperature sensor 106 indicates that a surface temperature of surface 105 (associated with the first compaction plan) exceeds a threshold temperature.

FIG. 6 is directed to a method 600 in which in block 602 information is received from memory 122, specifically diagnostic codes from OS 134 and/or utilities 136 that assist in controlling compactor 100 and determining whether compactor 100 should enter creep mode. In one example, OS 134 and/or utilities 136 can provide one or more diagnostic codes that relate to compactor 100's operation. It is therefore conceivable that one or more of the diagnostic codes need to be addressed before compactor 100 can resume compacting surface 105, at which point it may be desirable for compactor 100 to enter its creep mode.

In such situations, information is provided vis-a-vis OS 134 and/or utilities 136, possibly along with additional information, that causes compactor 100 to enter creep mode or evaluate whether to enter creep mode, as shown in block 602. That additional information may be an operating speed of compactor 100 from speed sensor 108, a location of compactor 100 from GPS device 112, a surface temperature of surface 105 from temperature sensor 106, obstacle information from perception system 114, setting information from settings module 146, and/or information from remote system 130 received via communications interface 128, etc.

At block 604, controller 110 analyzes whether or not diagnostic codes provided by OS 134 and/or utilities 136 need to be addressed before compactor 100 can continue compacting surface 105. If controller 110 determines the diagnostic codes do need to be addressed before compaction continues (e.g., because one or more of the diagnostic codes indicates an operating error that prevents proper compaction of surface 105), method 600 proceeds to the next step. If controller 110 determines the diagnostic codes do not need to be addressed before compaction continues, method 600 continues monitoring diagnostic codes received from OS 134 and/or utilities 136 until a particular set of diagnostic codes needs to be addressed.

At block 606, which is optional, GPS device 112 is used to provide the geographic location of compactor 100 with respect to work area 132 on surface 105. Block 606 works the same as block 306, as described above.

At block 608, which is also optional, temperature sensor 106 is used to provide the surface temperature of asphalt on surface 105. Block 608 works the same as block 308, as described above.

At block 610, controller 110 changes the operating speed of compactor 100 to a creep speed if one or more requirements are met. For example, in an embodiment, controller 110 changes the operating speed of compactor 100 to a creep speed if controller 110 determines one or more diagnostic codes received from OS 134 and/or utilities 136 need to be addressed before compaction continues. In another embodiment, controller 110 changes the operating speed of compactor 100 to a creep speed if controller 110 determines one or more diagnostic codes received from OS 134 and/or utilities 136 need to be addressed before compaction continues and GPS device 112 indicates that a location of compactor 100 is within work area 132 on surface 105. In yet another embodiment, controller 110 changes the operating speed of compactor 100 to a creep speed if controller 110 determines one or more diagnostic codes received from OS 134 and/or utilities 136 need to be addressed before compaction continues and temperature sensor 106 indicates that a surface temperature of surface 105 exceeds a threshold temperature. In still another embodiment, controller 110 changes the operating speed of compactor 100 to a creep speed if controller 110 determines one or more diagnostic codes received from OS 134 and/or utilities 136 need to be addressed before compaction continues, GPS device 112 indicates that a location of compactor 100 is within work area 132 on surface 105, and temperature sensor 106 indicates that a surface temperature of surface 105 exceeds a threshold temperature.

Other variations of the foregoing embodiments and what is described herein are also possible. For example, methods 300, 400, 500, 600 could involve relying on one or more inputs from drive system 103, temperature sensor 106, speed sensor 108, GPS device 112, perception system 114, communications interface 128, autonomous path planning system 129, remote system 130, OS 134 and/or utilities 136, and/or creep routine 138 (including settings module 146) to determine when to operate compactor 100 at a creep speed or in a creep mode.

INDUSTRIAL APPLICABILITY

In general, the compactor and method of operating a compactor on a surface of the present disclosure are applicable for use in various industrial applications, including preparation of roadways, building sites, and embankments with paving materials such as, for example, an asphalt material.

Operating a compactor at a creep speed or in a creep mode in accordance with the present disclosure helps the compactor avoid introducing defects or dips in a hot asphalt surface on which the compactor is operating by eliminating or at least reducing the frequency of situations in which the compactor sits still on the surface for too long or does not move quickly enough across the surface. In particular, the present disclosure describes evaluating various conditions related to the compactor and its surroundings to determine when to operate the compactor at a creep speed to avoid the compactor sinking into the surface due to its weight and the compressibility of the surface.

By interfacing with an autonomous path planning system and various other systems of the compactor, the present disclosure describes how a compactor confronted with a situation that would conventionally cause the compactor to come to an abrupt stop instead engages a creep mode. The compactor can intelligently navigate the situation (e.g., by moving around an obstacle in a path of the compactor, moving to another phase of a compaction plan, moving to the next compaction plan, etc.). Such solutions not only prevent the formation of defects or dips in the surface on which the compactor is operating, but also reduce the need for human intervention.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The present disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for operating a compactor on a compressible surface, the method comprising:
    receiving a first compaction plan, the first compaction plan including a path of the compactor on the compressible surface;
    moving the compactor on the compressible surface according to the first compaction plan;
    receiving an operating speed of the compactor;
    determining whether the first compaction plan is complete;
    determining whether a second compaction plan has been received; and
    changing the operating speed to a creep speed if the first compaction plan is complete and the second compaction plan has not been received,
    wherein the creep speed is sufficient to prevent the compactor from forming dips in the compressible surface.

2. The method of claim 1, further comprising:
    receiving a location of the compactor with respect to a work area on the compressible surface; and
    changing the operating speed to the creep speed only if the first compaction plan is complete, the second compaction plan has not been received, and the location is within the work area.

3. The method of claim 1, further comprising:

sensing a surface temperature of the compressible surface on which the compactor is disposed; and changing the operating speed to the creep speed only if the first compaction plan is complete, the second compaction plan has not been received, and the surface temperature exceeds a threshold temperature.

4. The method of claim 3, further comprising:

receiving a location of the compactor with respect to a work area on the compressible surface; and changing the operating speed to the creep speed only if the first compaction plan is complete, the second compaction plan has not been received, the surface temperature exceeds a threshold temperature, and the location is within the work area.

5. The method of claim 1, wherein the first compaction plan is received from an autonomous path planning system.

6. The method of claim 1, further comprising:

receiving setting information from a settings module; and changing the creep speed based on the setting information.

* * * * *